Jan. 11, 1944.    F. J. SODAY    2,338,741
SUBSTITUTED STYRENE-POLYBUTADIENE COPOLYMER
Filed March 11, 1939
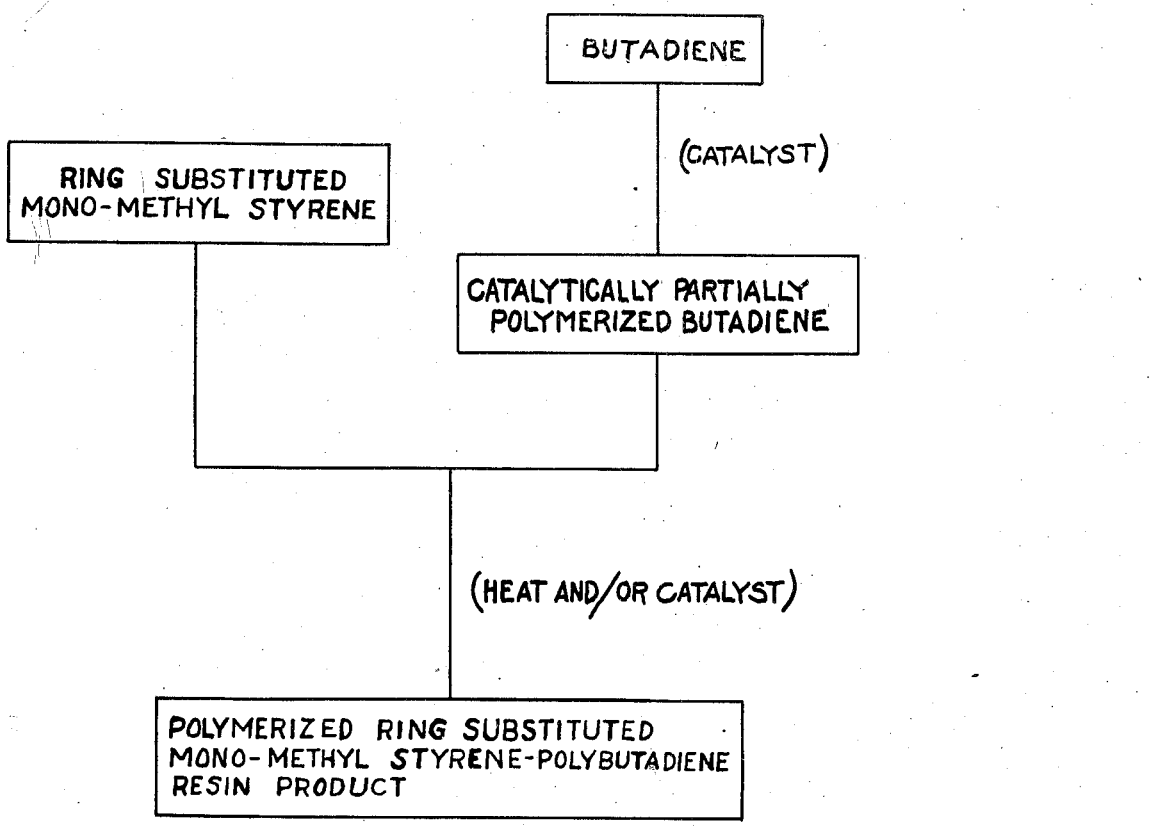

Patented Jan. 11, 1944

2,338,741

UNITED STATES PATENT OFFICE 2,338,741

SUBSTITUTED STYRENE-POLYBUTADIENE COPOLYMER

Frank J. Soday, Upper Darby, Pa., assignor to The United Gas Improvement Company, a corporation of Pennsylvania Application March 11, 1939, Serial No. 261,305

18 Claims. (Cl. 260—86.5)

This invention relates to new compositions of matter and to a method for their preparation.

More particularly, this invention pertains to resins resulting from reacting one or more monomeric ring substituted mono-methyl styrenes with butadiene which has been partially polymerized catalytically. Such material will be referred to herein as partially polymerized butadiene.

It is an object of this invention to provide a new type of synthetic resins. It is a further object of this invention to provide resins having utility in industrial fields, and particularly in the molding and liquid coating composition fields.

More particularly, it is an object of this invention to provide varnish and lacquer resins possessing excellent alkali, acid, and water resistant properties. It is also a particular object of this invention to provide molding resins which may be used with or without plasticizing agents or lubricants. It is a further object of this invention to provide resins adapted to produce a smooth surface pleasing in appearance. A further object of the invention is to provide a molding resin with substantially non-shrinking properties.

Still another object of this invention is to provide resins the color of which may be readily controlled and varied.

A still further object of the invention is to provide resins compatible with a wide variety of additive agents such as fillers, decorative constituents, pigments, softening agents, plasticizers, and the like.

Another object of the invention is to provide a process for preparing resins of the above character.

Still other objects will become apparent to those skilled in the art from the following description and illustrative examples.

This invention is based upon the discovery that new synthetic resins having highly desirable properties may be prepared by reacting one or more monomeric ring substituted mono-methyl styrenes with butadiene which has been previously partially polymerized catalytically.

The ring substituted mono-methyl styrenes may be represented as follows:

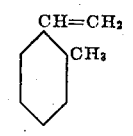

(o-Methyl styrene)

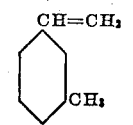

(m-Methyl styrene)

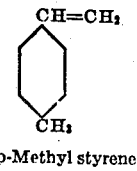

(p-Methyl styrene)

These ring substituted mono-methyl styrenes may be obtained by the distillation of the light oil from oil gas, as well as from other sources.

By partially polymerized butadiene is meant butadiene which has been subjected to catalytic polymerization conditions sufficient to change its chemical constitution from monomeric butadiene, said polymerization conditions, however, being insufficient to render the polymerized material incapable of further reaction.

The properties of the resulting resins vary somewhat with change in polymerization conditions, both with respect to the initial partial polymerization of butadiene and the subsequent polymerization of one or more monomeric ring substituted mono-methyl styrenes and the partially polymerized butadiene.

For example, the final resins will have increasingly higher melting points with increasingly greater initial polymerization of butadiene.

Furthermore, the relative proportions of monomeric ring substituted mono-methyl styrene and partially polymerized butadiene reflect themselves in the properties of the resultant resinous compounds to a large extent. For example, the resin resulting from reacting 60 parts of monomeric paramethyl styrene with 40 parts of partially polymerized butadiene results in a resinous compound which is particularly suitable for molding or casting. On the other hand, a resin resulting from reacting 40 parts of monomeric paramethyl styrene with 60 parts of partially polymerized butadiene is particularly suitable for varnish and lacquer purposes. In other words, larger proportions of monomeric ring substituted mono-methyl styrene result in resins more particularly suited for molding and casting purposes, whereas larger proportions of partially polymerized butadiene result in the production of resins more particularly suited for varnish and lacquer purposes.

Other factors which will have a modifying influence are the manner in which the initial and final polymerizations are conducted, the concentration and relative purity of the materials undergoing polymerization, the nature and quantity of catalyst employed, temperature range, reaction time, and the like.

For example, drastic conditions with respect to temperature, concentration of reactants, proportion of catalyst, and reaction time, may result in insoluble polymers or gels instead of the more desirable soluble resins.

The butadiene employed in the preparation of my new resins may be obtained from any suitable sources. For instance, it may be obtained by a variety of synthetic methods, or it may be obtained by the fractionation of condensates obtained in the manufacture of carburetted water gas, oil gas, refinery gas, or coke oven gas, or from similar sources. Such fractions will be referred to herein generally as light oil butadiene fractions. Fractions obtained in the manufacture of oil gas are particularly preferred.

Hydrocarbon fractions containing from 5 to 100% of butadiene may be successfully used in the production of the herein described partially polymerized butadiene, although, in general, the use of fractions containing from 50 to 100% butadiene is preferred for the production of resins of high quality.

Fractions in which butadiene is the only diolefine present are preferred, although fractions containing a lesser quantity of isoprene, cyclopentadiene or piperylene, or any combination of two or more of these, or similar materials, may be employed without departing from the broad concept of the invention.

The same applies to olefines, such as olefines having five carbon atoms.

The accompanying drawing represents a flow sheet of my invention in its broader aspects. As shown thereon, an initial step comprises catalytically partially polymerizing butadiene. The resulting product and ring substituted monomethyl styrene are thereafter subjected to further polymerization employing heat and/or a catalyst to obtain a product which is my novel polymerized ring substituted mono-methyl styrene-polybutadiene resin having very desirable characteristics for use in various arts.

INITIAL PARTIAL POLYMERIZATION OF BUTADIENE

The partial polymerization of butadiene is effected in any catalytically means of acid-acting metallic halides and particularly acid-acting metallic halide-organic solvent complexes. Examples of such catalysts are given hereinafter.

Although considerable variation is permissible when employing acid-acting metallic halide or acid-acting metallic halide-organic solvent complexes as catalysts, the polymerizing temperature should rarely exceed 100° C., and preferably should not exceed 70° C.; the concentration of butadiene should rarely exceed 80% by weight of the total solution, and the concentration of catalyst, which is preferably uniformly distributed, should rarely exceed 10% by weight of the butadiene present, although these values are not to be considered as fixed limits.

Two or more of the foregoing catalysts might be employed.

On the other hand, the initial polymerization may be carried out by a combination of heat and catalyst.

The catalytic partial polymerization may be carried out in the liquid state or in the vapor state, or both, and in the presence or absence of solvents.

The partial polymerization of butadiene in a light oil butadiene fraction is illustrated in the following example.

*Example 1*

A light oil butadiene fraction obtained in the manufacture of oil gas and containing 63.4% by weight of butadiene, 28.6% by weight of olefines, and 8.0% by weight of paraffin hydrocarbons was employed. A mixture containing 100 parts by weight of this butadiene fraction and 150 parts by weight of toluene was cooled to −20° C. and five parts by weight of powdered anhydrous aluminum chloride were added to the mixture during the course of one hour with good agitation. Agitation was continued at this temperature for a period of 12 hours, after which the reaction mixture was allowed to come up to room temperature and the reaction continued for an additional period of 18 hours. The catalyst was then hydrolyzed by the addition of a mixture of lime and water. This was followed by approximately 30 minutes of continuous agitation after which the resultant mixture containing partially polymerized butadiene and unpolymerized constituents was dried by the addition of a small quantity of lime, with agitation, for a period of approximately 1 hour. All solid extraneous matter was thereafter removed by filtration.

The fraction containing partially polymerized butadiene, in addition to unpolymerized material, was employed in the preparation of a methyl styrene-polybutadiene resin as will be more fully set forth hereinafter in Example 2.

On the other hand, the unpolymerized material may be wholly or partly removed prior to the final polymerization step.

The ring substituted mono-methyl styrene employed in the production of my new resins may be obtained from any suitable source, and may be in the form of pure or commercially or technically pure ring substituted mono-methyl styrene, or in the form of a solution or a fraction such as obtained from light oil or a mixture of light oil hydrocarbons. The source of light oil may be the same as in the case of butadiene previously referred to.

Mixtures of monomeric ring substituted mono-methyl styrenes also may be reacted with partially polymerized butadiene to give these new resins. The properties of these resins may be varied considerably by choice of starting materials.

Para-methyl styrene fractions obtained by the distillation of light oil and having boiling ranges between 160 to 180° C. have been satisfactorily employed in the preparation of para-methyl styrene-polybutadiene resins. Resins having especially desirable properties have been obtained when employing para-methyl styrene fractions having boiling ranges between 165 and 175° C. Even more desirable properties are secured in the final resins when the para-methyl styrene fractions employed have boiling ranges between 167 and 173° C.

A comparable degree of purity is preferred when using ring substituted mono-methyl styrenes other than para-methyl styrene in the preparation of these new resins.

The use of substantially pure ring substituted mono-methyl styrene or mixtures of substantially pure ring substituted mono-methyl styrenes is preferred when commercially feasible, particularly for resins of the molding type.

POLYMERIZATION OF RING SUBSTITUTED MONO-METHYL STYRENE AND PARTIALLY POLYMERIZED BUTADIENE

Polymerization of monomeric ring substituted mono-methyl styrene or styrenes and partially polymerized butadiene is preferably carried out by application of heat, although the reaction may be carried out through the use of catalysts with or without the application of heat, without departing from the broad concept of the invention.

The polymerization may be carried out in the liquid state or in the vapor state, or both, and in the presence or absence of solvents.

When the polymerization of ring substituted mono-methyl styrene or styrenes and partially polymerized butadiene is effected by the application of heat, a temperature between 50° and 250° C. is preferred. Temperatures between 75° and 200° C. are found to be particularly suitable.

The reaction time may be varied over fairly wide limits, depending upon the extent of the polymerization desired.

The following example illustrates procedure for the preparation of my new resin.

Example 2

Approximately 170 parts by weight of a monomeric para-methyl styrene fraction obtained from light oil produced in the manufacture of oil gas and containing approximately 53.2% para-methyl styrene, was mixed with approximately 45 parts by weight of a partially polymerized butadiene fraction containing approximately 10 parts by weight of partially polymerized butadiene prepared as shown in Example 1. This mixture was placed in a glass bomb and sealed in an atmosphere of nitrogen. The bomb was heated for a period of ten days at a temperature of approximately 100° C. Unpolymerized material was removed from the resulting mass by vaporization at a temperature of approximately 100° C. and a pressure of approximately 1.0 mm. of mercury, absolute. There was thus obtained approximately 66 parts by weight of a polymerized para-methyl styrene-polybutadiene resin having properties making the resin particularly suitable for use as a molding resin. The product was a light amber, transparent, plastic solid.

A portion of the resin was molded at a temperature of approximately 200° C. and a pressure of 2,000 pounds per square inch. The resulting object was light amber in color and completely transparent. It was hard and tough and took a very high polish.

Molding resins made in accordance with my invention are characterized not only by hardness, toughness, pleasing appearance, ability to take a high polish, good molding properties, and inert characteristics, but also in imparting a warm and pleasing sensation to the touch. The latter is extremely important in the trade.

My new resins may be prepared in many desirable color combinations. Color may be obtained either naturally or artificially. Natural colors may be secured by varying the source and quality of either the ring substituted monomethyl styrene or styrenes or the butadiene, or both. Either plain or mottled color combinations may be thus obtained.

Resins which are milk-white in color and which resemble ivory in appearance may be prepared by polymerizing mixtures containing pure monomeric ring substituted mono-methyl styrene or styrenes and partially polymerized butadiene.

Artificial colors and color combinations may be produced through the addition to my new resins of suitable chemical compounds.

Coloring materials, such as organic dyes, inorganic dyes, pigments, and lakes, may be added to any one or more of the reactants, or to the reaction mixture at any stage, but preferably prior to complete polymerization.

As a rule organic dyes and other organic coloring bodies produce resins with pastel shades.

The coloring compound may, of course, be added to the unpolymerized butadiene, and may or may not be supplemented during the secondary polymerization reaction, as desired. Or the coloring compound can be added during the second phase of the reaction.

If desired, the coloring material itself may be prepared in situ by adding the necessary materials to the polymerization reaction.

As an example, a short list of suitable coloring materials is given in the following table.

Table 1

| Color | Dye group |
|---|---|
| Orange | Mono azo. |
| Yellow | Do. |
| Green | Triphenylmethane. |
| Heliotrope | Triphenylmethane pyronine. |
| Red | Pyronine. |
| Black | Diphenyl amine. |

Mottled effects may be obtained by adding coloring material to the polymerization mass at a stage in the polymerization reaction after which thorough stirring is no longer required.

Attention is directed to the fact that certain coloring materials may also act as catalysts or as inhibitors to the polymerization reaction. Accordingly, coloring materials should be selected as to (1) their inertness, (2) their action as catalysts, and (3) their action as inhibitors in order to obtain the desired result. In this connection, inhibitors may be employed to retard an otherwise too hasty reaction.

A proper choice of polymerizing conditions will enable almost any type of coloring material to be used.

In addition to coloring materials, other additives may be incorporated, such as fillers, of which asbestos, mica, wood flour, cotton linters, and fabric waste are examples.

A decorative filler functioning very much on the order of a coloring material may be added, with or without coloring matter. Examples of decorative fillers are pearl essence, flaked mercurous chloride, and chitin extracts.

Furthermore, other agents such as mold lubricants, softeners, plasticizers, and the like, may also be added at any stage of the polymerization process.

While the use of heat as a polymerizing agent is preferred when reacting ring substituted monomethyl styrene or styrenes with catalytically partially polymerized butadiene, other polymerizing agents may be employed if desired either with or without the application of heat.

For instance, polymerization catalysts, such as metallic halides, metallic halide-organic solvent complexes, organic peroxides, contact materials, ultra violet light, ultra sonics, mineral acids, mineral acid-organic solvent mixtures, active metals, etc., may be employed.

Examples of catalysts which may be employed in either the initial or final polymerization reaction are acid-acting metallic halides such as for example aluminum chloride, aluminum bromide, stannic chloride, boron trifluoride, boron trichloride, zinc chloride, ferric chloride and organic solvent complexes of the foregoing metallic halides. Examples of other catalysts which may be employed in the final polymerization are pinene peroxide, benzoyl peroxide, clay, activated clay, activated carbon, activated alumina, silica gel, fuller's earth, diatomaceous earth, sulfuric acid, phosphoric acid, sulfuric acid-diethyl ether mixture, sodium and potassium.

Organic solvent complexes of the metallic halides are formed by adding the halide to the organic solvent followed by stirring. Examples of organic solvents are benzene, toluene, pentene, decene, diethyl ether, phenyl methyl ether, phenyl ethyl ether, diisopropyl ether, etc.

Metallic halide catalysts (including complexes of such metallic halides) are well-known to be distinguished as a class by their tendency to hydrolyze in the presence of water, giving an acid reaction. They are therefore frequently designated as "acid-acting metallic halides." This term includes the boron halides.

The catalyst employed in the initial reaction may be used as such or in admixture such as with a suitable solvent to form a suspension, solution, or emulsion. A catalyst when employed in the final reaction may be used in similar manner.

Likewise, the reactants may be employed as such or in admixture such as with a suitable solvent, or with additives such as coloring materials etc., referred to above.

In order to control more closely the speed and uniformity of the reaction, I may slowly add, with thorough agitation, a solution of the reactant or reactants to a suspension or solution of the catalyst in an organic solvent. Or, the catalyst may be added to the reactant or reactants, or to a solution containing the same.

Examples of suitable solvents or diluents for both catalysts and reactants are benzene, toluene, xylene, solvent naphtha, petroleum naphtha, and carbon tetrachloride.

In any event, the addition of one material to the other is preferably accompanied by thorough stirring which is preferably rapid to insure uniform distribution of both materials and temperature.

In addition, the reaction is preferably carried out in apparatus capable of temperature control such as a jacketed vessel provided with an agitator.

The quantity of catalyst may be varied over a rather wide range in both the initial and the final polymerization reactions, although it is found preferable to employ limited quantities such as from 0.1% to 10% by weight of reactants present.

In general, when employing catalysts to polymerize ring substituted mono-methyl styrene or styrenes and partially polymerized butadiene, temperatures between −60 and 145° C. are suitable. I prefer, however, to use temperatures between −40 and 60° C.

The upper limit of permissible temperature is largely determined by (1) the concentration of reactants, (2) the concentration of catalyst, and (3) the reaction time employed. Therefore, if it is found that polymerization conditions are sufficiently drastic to produce an insoluble polymer or gel when a soluble polymer is desired, one or more of the four conditions, namely, (1) temperature, (2) concentration of reactants, (3) proportion of catalyst, and (4) reaction time should be reduced until the desired soluble polymer is obtained.

In general, in both the initial and final polymerizations, it is preferred to completely remove catalyst from the reaction mass after the desired polymerization is obtained.

Metallic halides, metallic halide-organic solvent complexes and organic peroxides may be removed by any suitable means, such as treating the reaction mass with an alkaline solution followed by thorough washing with water and filtration.

Contact materials may be removed from the reaction mass by settling, filtration, or centrifuging, or otherwise.

While in the foregoing description reference has not been expressly made to a change in polymerization agent during any single polymerization step, it is to be understood that a change in polymerization agent during any single polymerization step might be resorted to if desired.

For instance, the initial partial polymerization of butadiene might be carried out in part by the use of a catalyst, the catalyst removed and the partial polymerization completed by the application of heat. On the other hand, heat might be applied initially followed by the use of a catalyst. The use of both heat and catalyst has already been referred to.

Likewise, the polymerization of monomeric ring substituted mono-methyl styrene or styrenes with partially polymerized butadiene might be effected in part by the use of heat and completed by the use of a catalyst, or the polymerization might be started by use of a catalyst, the catalyst removed and the polymerization completed by the use of heat. The use of heat and/or catalyst has already been referred to.

I prefer to carry out both the initial and the final polymerizations in the presence of an inert and preferably non-catalytic gas, such as carbon dioxide or nitrogen, or in the presence of solvent vapors, or vapors of the reaction mass, or in a vacuum. In general, the exclusion of air or oxygen from the material during the polymerization process will prevent any possible formation of undesirable compounds, although this step is by no means essential.

Furthermore, while it is preferred to carry out the initial catalytic partial polymerization and the final polymerization with the reactants at least for the most part in the liquid phase, it is to be understood that the reactants might be in the gaseous phase or partly in the gaseous phase and partly in the liquid phase.

While any proportion of partially polymerized butadiene to ring substituted mono-methyl styrene or styrenes may be employed in making my new resin, I prefer in the case of coating compositions to employ between 50 and 99% partially polymerized butadiene on the undiluted basis to between 1 and 50% monomeric ring substituted mono-methyl styrene or styrenes on the undiluted basis. 60% to 90% partially polymerized butadiene to 40% to 10% monomeric ring substituted mono-methyl styrene or styrenes is very suitable.

The resin obtained by polymerizing a mixture containing 80 parts of partially polymerized butadiene to 20 parts of monomeric ring substituted mono-methyl styrene or styrenes is excellent.

On the other hand, in the case of casting or molding compositions, I prefer to employ between 50% and 99% monomeric ring substituted mono-methyl styrene or styrenes to between 50% to 1% partially polymerized butadiene on the undiluted basis. 70% to 95% monomeric ring substituted mono-methyl styrene or styrenes to 30% to 5% partially polymerized butadiene is very suitable.

The resin obtained by the polymerization of a mixture containing 90 parts of monomeric ring substituted mono-methyl styrene or styrenes to 10 parts of partially polymerized butadiene usually possesses excellent molding properties. In the event of the removal of extraneous materials, such as unpolymerized material from the partially polymerized butadiene, and hydrocarbons of similar boiling point from the monomeric ring substituted mono-methyl styrene or styrenes before their polymerization, a highly superior product is obtained. If desired, a polymerization diluent such as benzene, toluene, etc. may be employed.

While when partially polymerized butadiene is present in greater proportion in the reaction mass, the resulting resin is ideally suited to the coating of surfaces in general, such as of metal, wood, glass, ceramic substances, etc., and particularly to the coating of metal surfaces, it may be used for any other purposes, for instance, for lacquers generally, for varnishes either alone or in admixture with other resins, for enamels, for paints, for coating compositions generally, or perhaps, if desired, for casting and molding particularly when the spread in proportion of reactants is not too great.

While when monomeric ring substituted monomethyl styrene or styrenes are present in larger proportion in the reaction mass, the resulting resin is ideally suited for casting or molding purposes in which it may be employed alone, or in admixture with other plastics or resins, either with or without the addition of coloring agents, fillers, etc., it is conceivable that, if desired, the resin might be used for coating purposes, particularly if the spread in proportion of reactants is not too great.

Furthermore, while in the case of the catalyst employed in the initial catalytic partial polymerization step and when a catalyst is employed in the final polymerization step it is preferred to have both the catalyst and the reactants in diluted form, it is to be understood that any other procedure might be followed without departing from the broad concept of the invention. For instance, all of the diluent may be first mixed with either the catalyst or the reactant, or reactants, leaving the other in concentrated form. Or the larger part of the diluent may be added to one, thus leaving the other relatively concentrated. On the other hand, both the catalyst and the reactant or reactants might be employed in concentrated form, particularly if the observations herein with respect to (1) proportion of catalyst, (2) temperature, and (3) reaction time are followed.

It will be understood that any other suitable alkali, such as sodium hydroxide, sodium carbonate, sodium bicarbonate, magnesium hydroxide, an amine or other basic substance might be substituted for lime in the removal of catalyst, preferably followed by a non-acidic drying agent such as sodium sulphate or soda lime. Both neutralizing and drying is effected by lime. Neutralization is preferably followed by filtration, centrifuging or settling to remove extraneous solids.

While I have spoken rather disparagingly of the insoluble type of resin, this is because it is also generally infusible and, therefore, has few if any important uses at the present time. Should an important use develop for a resin which is insoluble and infusible before use my process may likewise be used to obtain this material in good yield by employing drastic conditions as to (1) concentration of reactants, (2) concentration of catalyst, (3) temperature, and (4) reaction time.

It is to be understood that while it is preferred to change all or substantially all of the monomeric butadiene to partially polymerized butadiene during the initial polymerization reaction, such initial polymerization may be conducted in such a manner as to polymerize only a part of the butadiene present without departing from the spirit of the invention.

While in the examples listed, the initial partial polymerization of the butadiene or butadiene fraction is terminated prior to the addition of the monomeric ring substituted mono-methyl styrene or styrenes, the reaction can also be carried out by the partial polymerization of the butadiene, the addition of the monomeric ring substituted mono-methyl styrene or styrenes during the course of this reaction, and the completion of the reaction in any desired manner.

Furthermore, while as above particularly described, the catalyst was removed from the partially polymerized butadiene before its co-polymerization with monomeric ring substituted mono-methyl styrene or styrenes, it is to be understood that the co-polymerization may, if desired, be carried forward without first removing such catalyst.

The term "ring substituted mono-methyl styrene" as used in the claims, and unless otherwise modified, is intended to embrace pure and substantially pure monomeric ring substituted monomethyl styrene, or a mixture of such substituted styrenes, commercial and technical grades thereof, and any mixture or fraction in which one or more monomeric ring substituted mono-methyl styrene is the predominating active material of said mixture or fraction in the polymerization reaction with partially polymerized butadiene.

The term "butadiene" as used in the claims, and unless otherwise modified, is intended to embrace pure and substantially pure monomeric butadiene, commercial and technical grades thereof, and any mixture or fraction in which monomeric butadiene is the predominating active material of said mixture or fraction in the partial polymerization thereof.

The term "partially polymerized butadiene" as used in the claims, and unless otherwise modified, is intended to embrace butadiene, as defined in the preceding paragraph, which has been subjected to catalytic polymerization sufficient to change the chemical constitution of at least a part of the monomeric butadiene, said catalytic polymerization, however, being insufficient to render the polymerized butadiene incapable of further reaction.

The term "acid-acting metallic halide catalyst" as used in the claims and unless otherwise modified is intended to include within its scope not only acid-acting metallic halides per se, but also complexes thereof, such as organic solvent complexes. The term "acid acting metallic halide" is likewise intended to include within its scope boron halides as well as complexes thereof.

When percentages of ring substituted monomethyl styrene and partially polymerized butadiene are expressly recited in the claims, these are entered to express the properties of these specific compounds on the undiluted basis, that is irrespective of the presence of other material.

It is to be understood that the above particular description is by way of illustration and that changes, omissions, additions, substitutions, and/or modifications might be made within the scope of the claims without departing from the spirit of the invention which is intended to be limited only as required by the prior art.

I claim:

1. A process comprising polymerizing a light oil ring substituted methyl styrene fraction obtained in the manufacture of oil gas with a light oil butadiene fraction which has been previously partially polymerized catalytically with the aid of an acid-acting metallic halide catalyst; said light oil butadiene fraction having been obtained in the manufacture of oil gas.

2. A synthetic resin comprising the product resulting from the polymerization of ring substituted mono-methyl styrene with butadiene which has been previously partially polymerized catalytically with the aid of an acid-acting metallic halide catalyst.

3. A synthetic resin comprising the product resulting from the polymerization of a light oil ring substituted methyl styrene fraction in which ring substituted methyl styrene is the predominating active compound with butadiene which has been previously partially polymerized catalytically with the aid of an acid-acting metallic halide catalyst.

4. A synthetic resin comprising the product resulting from the polymerization of ring substituted mono-methyl styrene with a light oil butadiene fraction which has been previously partially polymerized catalytically with the aid of an acid-acting metallic halide catalyst, said light oil butadiene fraction prior to said partial polymerization containing more butadiene than other diolefine material.

5. A synthetic resin comprising the product resulting from the polymerization of a light oil ring substituted methyl styrene fraction in which ring substituted methyl styrene is the predominating active compound with a light oil butadiene fraction which has been previously partially polymerized catalytically with the aid of an acid-acting metallic halide catalyst, said light oil butadiene fraction prior to said partial polymerization containing more butadiene than other diolefine material.

6. A new resinous composition for use in liquid coating compositions comprising the product of the polymerization of from 50% to 99% butadiene which has been previously partially polymerized catalytically with the aid of an acid-acting metallic halide catalyst with from 1% to 50% ring substituted mono-methyl styrene.

7. A new resinous composition for use in liquid coating compositions comprising the product of the polymerization of from 60% to 90% butadiene which has been previously partially polymerized catalytically with the aid of an acid-acting metallic halide catalyst with from 40% to 10% of ring substituted mono-methyl styrene.

8. A new resinous composition for use in molding compositions comprising the product of the polymerization of from 50% to 99% ring substituted mono-methyl styrene with from 50% to 1% butadiene which has been previously partially polymerized catalytically with the aid of an acid-acting metallic halide catalyst.

9. A new resinous composition for use in molding compositions comprising the product of the polymerization of from 70% to 95% of ring substituted mono-methyl styrene with from 30% to 5% butadiene which has been previously partially polymerized catalytically with the aid of an acid-acting metallic halide catalyst.

10. A molding composition comprising the product resulting from the polymerization of from 50% to 99% highly concentrated ring substituted mono-methyl styrene with from 1% to 50% butadiene which has been previously partially polymerized catalytically with the aid of an acid-acting metallic halide catalyst.

11. A molding composition comprising the product resulting from the polymerization of from 50% to 99% highly concentrated ring substituted mono-methyl styrene with from 1% to 50% highly concentrated butadiene which has been previously partially polymerized catalytically with the aid of an acid-acting metallic halide catalyst.

12. A process comprising polymerizing ring substituted mono-methyl styrene with butadiene which has been previously partially polymerized catalytically with the aid of an acid-acting metallic halide catalyst.

13. A process comprising heat polymerizing ring substituted mono-methyl styrene with butadiene which has been previously partially polymerized catalytically with the aid of an acid-acting metallic halide catalyst.

14. A synthetic resin comprising the product resulting from the heat polymerization of monomeric ring substituted mono-methyl styrene with butadiene which has been previously partially polymerized catalytically with the aid of an acid-acting metallic halide catalyst.

15. A new resinous composition comprising the thermoplastic product resulting from the heat polymerization of from 60 to 90% butadiene which has been previously partially polymerized catalytically with the aid of an acid-acting metallic halide catalyst with from 40% to 10% monomeric ring substituted mono-methyl styrene.

16. A new resinous composition comprising the thermoplastic product resulting from the heat polymerization of from 70% to 95% monomeric ring substituted mono-methyl styrene with from 30% to 5% butadiene which has been previously partially polymerized catalytically with the aid of an acid-acting metallic halide catalyst.

17. A process for the copolymerization of ring substituted mono-methyl styrene and a light oil butadiene fraction at least 50% in butadiene concentration, comprising subjecting said light oil butadiene fraction to polymerizing conditions in the presence of an acid-acting metallic halide catalyst and maintaining the temperature throughout the reaction mass not in excess of 100° C., the concentration of butadiene not in excess of 80% by weight, and the proportion of catalyst to butadiene not in excess of 10% by weight, stopping the foregoing reaction while said butadiene is still in a partially polymerized state, admixing resulting partially polymerized butadiene and monomeric ring substituted mono-methyl styrene, and subjecting the resulting admixture to polymerizing conditions to produce a synthetic resin.

18. The product of the process of claim 17.

FRANK J. SODAY.